(12) United States Patent
Hsiao et al.

(10) Patent No.: US 11,067,820 B2
(45) Date of Patent: Jul. 20, 2021

(54) STRUCTURED LIGHT PROJECTOR AND THREE-DIMENSIONAL IMAGE SENSING MODULE

(71) Applicant: HIMAX TECHNOLOGIES LIMITED, Tainan (TW)

(72) Inventors: Ming-Shu Hsiao, Tainan (TW); Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 480 days.

(21) Appl. No.: 16/049,818

(22) Filed: Jul. 31, 2018

(65) Prior Publication Data
US 2020/0041809 A1 Feb. 6, 2020

(51) Int. Cl.
| G02B 27/42 | (2006.01) |
| G02B 27/00 | (2006.01) |
| H04N 13/254 | (2018.01) |
| G02B 5/18 | (2006.01) |
| H04N 13/207 | (2018.01) |
| G02B 30/00 | (2020.01) |
| G06T 7/521 | (2017.01) |

(52) U.S. Cl.
CPC ....... *G02B 27/4205* (2013.01); *G02B 5/1842* (2013.01); *G02B 27/0037* (2013.01); *G02B 30/00* (2020.01); *G06T 7/521* (2017.01); *H04N 13/207* (2018.05); *H04N 13/254* (2018.05); *G06T 2207/10028* (2013.01)

(58) Field of Classification Search
CPC .. G02B 27/01–0189; G02B 26/00–129; G02B 2027/0105–0198; G03B 21/00–64; H04N 9/31–3197
See application file for complete search history.

(56) References Cited

U.S. PATENT DOCUMENTS

| 8,007,141 | B2 | 8/2011 | Matsubara et al. |
| 9,400,177 | B2 | 7/2016 | Pesach |
| 9,778,476 | B2 | 10/2017 | Hazeghi et al. |
| 2014/0307307 | A1 | 10/2014 | Georgiou et al. |

(Continued)

FOREIGN PATENT DOCUMENTS

| TW | 201213858 | 4/2012 |
| WO | 2009058556 | 5/2009 |

OTHER PUBLICATIONS

"Office Action of Taiwan Counterpart Application," dated Feb. 11, 2019, p. 1-p. 4.

*Primary Examiner* — Michelle M Iacoletti
*Assistant Examiner* — Christopher A Lamb, II
(74) *Attorney, Agent, or Firm* — JCIPRNET

(57) ABSTRACT

A structured light projector including a light source, an irradiation range controlling device, and a diffractive optical element is provided. The irradiation range controlling device is disposed on a transmission path of a light beam from the light source. The diffractive optical element is disposed on a transmission path of the light beam from the irradiation range controlling device. The irradiation range controlling device is adapted to control an irradiation range of the light beam transmitted to the diffractive optical element so as to change a size of a region of the diffractive optical element illuminated by the light beam from the irradiation range controlling device. A three-dimensional image sensing module using the same is also provided.

18 Claims, 11 Drawing Sheets

(56) References Cited

U.S. PATENT DOCUMENTS

| | | | |
|---|---|---|---|
| 2019/0018137 A1* | 1/2019 | Akkaya | G02B 26/0808 |
| 2019/0041736 A1* | 2/2019 | Grunnet-Jepsen | G02B 27/0961 |
| 2019/0049720 A1* | 2/2019 | Bardagjy | G01B 11/2536 |
| 2020/0259982 A1* | 8/2020 | Bardagjy | H04N 5/2351 |

* cited by examiner

STRUCTURED LIGHT PROJECTOR AND THREE-DIMENSIONAL IMAGE SENSING MODULE

BACKGROUND

Technical Field

The invention relates to a projector and a light source module using the same and more particularly relates to a structured light projector and a three-dimensional image sensing module using the same.

Description of Related Art

Compared to traditional two-dimensional (2D) image sensing technology, three-dimensional (3D) image sensing technology further captures the depth information (i.e. information in the Z axis direction) of the target in addition to the information in the X-Y plane, thus not only improving the accuracy of recognition, but also broadens the application field thereof. Currently, 3D image sensing technology can be mainly classified into stereo vision, structured light, and time of flight (TOF). Compared to the stereo vision and the time of flight technologies, the structured light technology has high accuracy of depth recognition and is suitable for short distance measurement. Therefore, the structured light technology has been widely used in face recognition, somatosensory game machines, industrial machine vision inspection (e.g. AOI) and other application fields.

The operation principle of the structured light technology is to project a structured light beam on the target, and then capture the pattern (e.g. the diffraction pattern) projected on the target through a camera. Since differences in the depth of the target result in deformation of the diffraction pattern projected thereon, the three-dimensional coordinates of the target can be obtained by comparing the difference between the diffraction pattern on the target and the original diffraction pattern (undeformed diffraction pattern). However, in the conventional 3D image sensing module using the structured light technology, the resolution (e.g. dot density) and the field of view (FOV) of the diffraction pattern are fixed and cannot be functionally modulated. Therefore, a single 3D image sensing module in the conventional art is not suitable for or capable of measuring depth information of targets that need different resolutions or fields of view.

SUMMARY

The invention provides a structured light projector and a three-dimensional image sensing module, of which the resolution and the field of view can be functionally modulated.

The invention provides a structured light projector including a light source, an irradiation range controlling device, and a diffractive optical element. The irradiation range controlling device is disposed on a transmission path of a light beam from the light source. The diffractive optical element is disposed on a transmission path of the light beam from the irradiation range controlling device. The irradiation range controlling device is adapted to control an irradiation range of the light beam transmitted to the diffractive optical element so as to change a size of a region of the diffractive optical element illuminated by the light beam from the irradiation range controlling device.

The invention also provides a three-dimensional image sensing module including the above-mentioned structured light projector, an image sensor and a computing device. The image sensor is adapted to capture an image of a diffraction pattern generated on a target by the light beam illuminating the region of the diffractive optical element. The computing device is coupled to the image sensor and calculates a depth information of the target according to the captured image.

In an embodiment of the structured light projector and the three-dimensional image sensing module of the invention, the light source is a laser light source.

In an embodiment of the structured light projector and the three-dimensional image sensing module of the invention, the irradiation range controlling device includes a plurality of tunable lenses. The plurality of tunable lenses are sequentially disposed on the transmission path of the light beam from the light source. Each of the plurality of tunable lenses has tunable refracting power.

In an embodiment of the structured light projector and the three-dimensional image sensing module of the invention, the irradiation range controlling device includes a tunable lens and a position controlling device. The position controlling device is adapted to control at least one of a position of the tunable lens and a position of the light source.

In an embodiment of the structured light projector and the three-dimensional image sensing module of the invention, the irradiation range controlling device includes a light collimating element and a tunable aperture stop. The tunable aperture stop is disposed on the transmission path of the light beam from the light source. The light collimating element is disposed on a transmission path of the light beam from the tunable aperture stop. The tunable aperture stop has a tunable aperture.

In an embodiment of the structured light projector and the three-dimensional image sensing module of the invention, the irradiation range controlling device includes a light collimating element, an aperture stop with a fixed aperture, and a position controlling device. The aperture stop is disposed on the transmission path of the light beam from the light source. The light collimating element is disposed on a transmission path of the light beam from the aperture stop. The position controlling device is adapted to control at least one of a position of the aperture stop, a position of the light collimating element and a position of the light source.

In an embodiment of the structured light projector and the three-dimensional image sensing module of the invention, the diffractive optical element includes a first region and a second region surrounding the first region. The diffraction pattern generated on the target by the light beam illuminating the first region is a first diffraction pattern, and the diffraction pattern generated on the target by the light beam illuminating the second region is a second diffraction pattern. Under a first mode of the structured light projector, the region illuminated by the light beam from the irradiation range controlling device is consisted of the first region, and the first diffraction pattern is generated on the target. Under a second mode of the structured light projector, the region illuminated by the light beam from the irradiation range controlling device is consisted of the first region and the second region, and both of the first diffraction pattern and the second diffraction pattern are generated on the target.

In an embodiment of the structured light projector and the three-dimensional image sensing module of the invention, the first diffraction pattern and the second diffraction pattern do not overlap, and the diffraction pattern generated under the first mode has a smaller field of view than the diffraction pattern generated under the second mode.

In an embodiment of the structured light projector and the three-dimensional image sensing module of the invention, the first diffraction pattern and the second diffraction pattern overlap, and the diffraction pattern generated under the first mode has a smaller dot density than the diffraction pattern generated under the second mode.

In an embodiment of the structured light projector and the three-dimensional image sensing module of the invention, the first diffraction pattern and the second diffraction pattern partially overlap. The diffraction pattern generated under the first mode has a smaller field of view than the diffraction pattern generated under the second mode, and the diffraction pattern generated under the first mode has a smaller dot density than the diffraction pattern generated under the second mode.

Based on the above, in the embodiments of the structured light projector and the three-dimensional image sensing module of the invention, the region of the diffractive optical element illuminated by the light beam is modulated by disposing the irradiation range controlling device on the transmission path of the light beam from the light source, such that the resolution and the field of view of the diffraction pattern can be functionally modulated.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
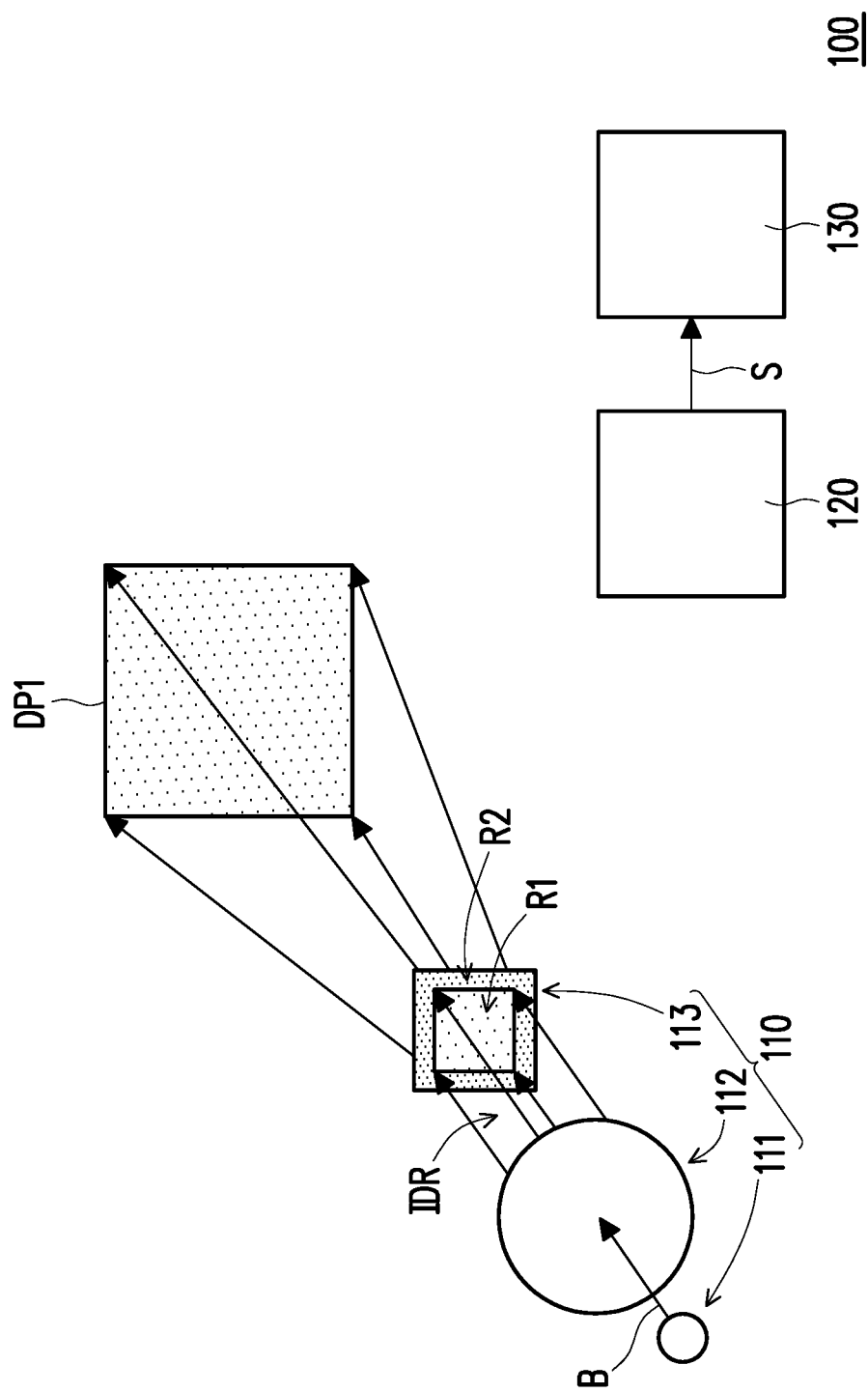
FIGS. 1A and 1B are schematic diagrams of a three-dimensional image sensing module according to a first embodiment of the invention under a first mode and a second mode, respectively.

In the drawings, various drawings represent general characteristics of methods, structures, and/or materials used in a particular exemplary embodiment. However, the drawings are not limited to the structures or characteristics of the following embodiments, and these drawings should not be construed as defining or limiting the scope or nature of the features covered by these exemplary embodiments. For example, the relative thickness and location of layers, regions, and/or structures may be reduced or magnified for clarity.

In the exemplary embodiments, similar or identical elements are assigned with similar or identical reference numerals. Thus, description of the materials, relative configuration, and effects of the similar or identical elements will be omitted.

The three-dimensional image sensing module listed in the following exemplary embodiments is suitable for capturing the depth information of a target in addition to the information in the X-Y plane. Namely, the three-dimensional image sensing module listed in the following exemplary embodiments is suitable for obtaining the three-dimensional coordinates (i.e. the coordinates in x, y and z directions) of the target.

Figure 1B:
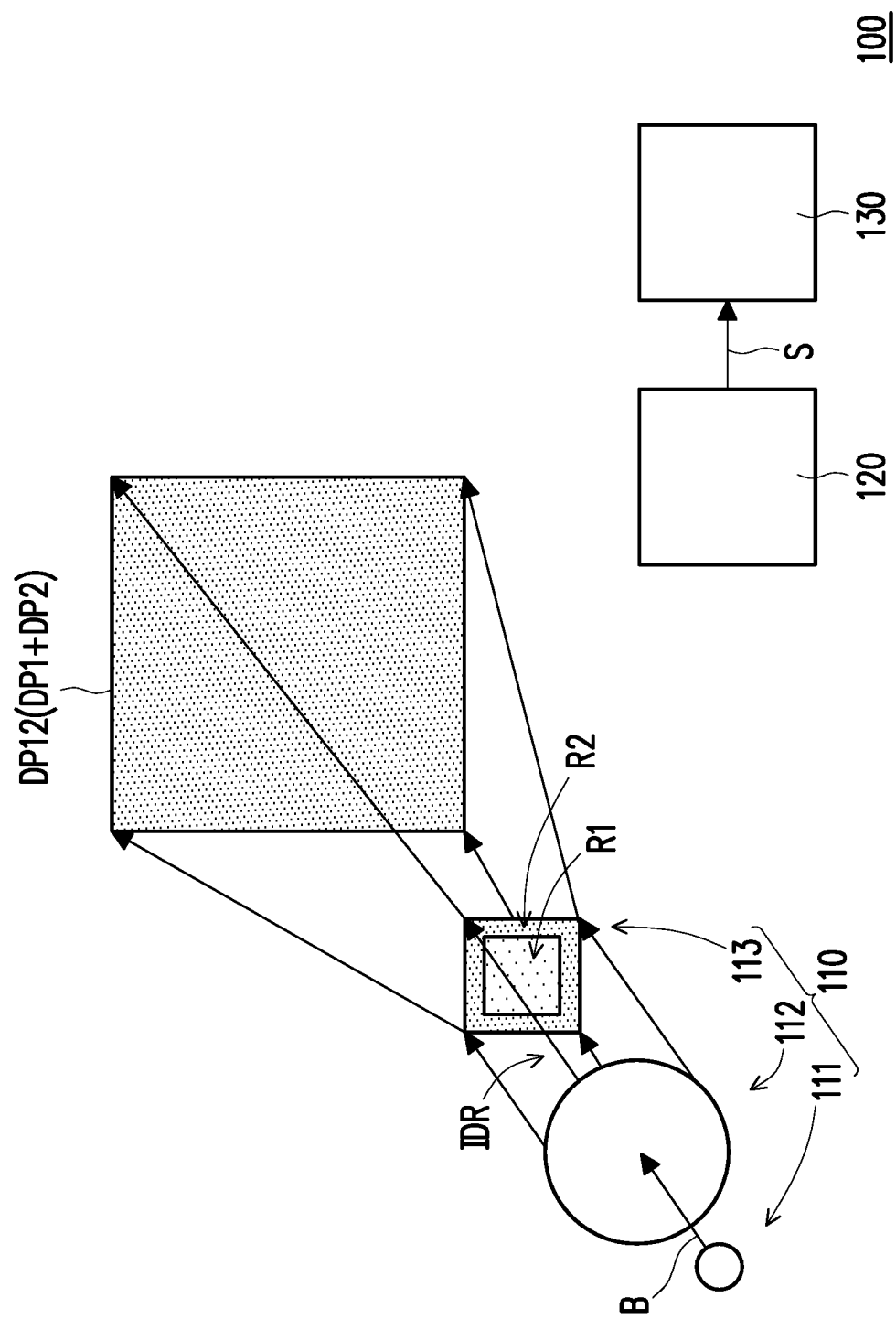

FIGS. 1A and 1B are schematic diagrams of a three-dimensional image sensing module according to a first embodiment of the invention under a first mode and a second mode, respectively. Referring to FIGS. 1A and 1B, the three-dimensional image sensing module 100 of the first embodiment includes a structured light projector 110, an image sensor 120 and a computing device 130.

The structured light projector 110 is adapted to project diffraction patterns (e.g. DP1 and DP12) with different fields of view on a target (not shown) under different modes. For example, the structured light projector 110 is adapted to project the diffraction pattern (e.g. the first diffraction pattern DP1) having a smaller field of view on the target under the first mode and project the diffraction pattern DP12 having a larger field of view on the target under the second mode.

Specifically, the structured light projector 110 includes a light source 111, an irradiation range controlling device 112, and a diffractive optical element 113. The light source 111 is adapted to provide a light beam B for identifying three-dimensional coordinate information. The light source 111 is a laser light source, for example. However, the type of the light source can be changed as required.

The irradiation range controlling device 112 is disposed on a transmission path of the light beam B from the light source 111, and the diffractive optical element 113 is disposed on a transmission path of the light beam B from the irradiation range controlling device 112. The irradiation range controlling device 112 is adapted to control an irradiation range IDR (e.g. the volume enclosed by the four arrows between the irradiation range controlling device 112 and the diffractive optical element 113) of the light beam B transmitted to the diffractive optical element 113 so as to change a size of a region of the diffractive optical element 113 illuminated by the light beam B from the irradiation range controlling device 112.

To be specific, the diffractive optical element 113 includes a plurality of microstructures to produce a two-dimensional diffraction pattern in the far field. The design of the microstructures is well known in the art and thus the description thereof is omitted. In the embodiment, the diffractive optical element 113 includes a first region R1 and a second region R2 surrounding the first region R1. In the embodiment, the first region R1 is a square, the second region R2 is a frame surrounding the square, wherein the square and the frame share the same central axis (not shown). However, the shapes of the regions and the number of the regions included in the diffractive optical element 113 can be changed as required. Besides, the shapes and the pitches of the microstructures in each region can be designed as required.

Figure 2C:
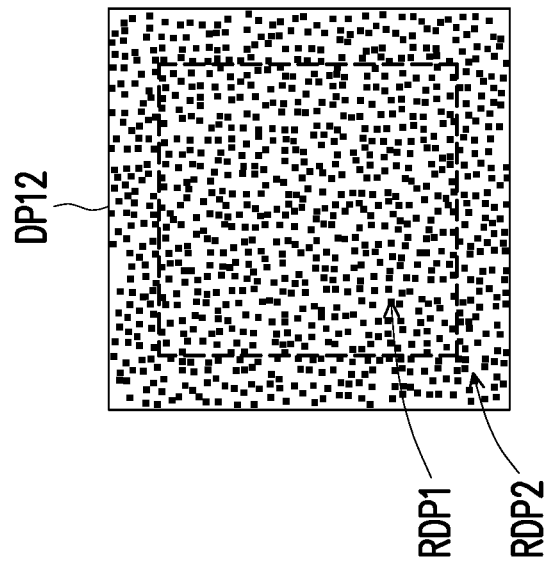
FIGS. 2A to 2C are schematic diagrams of diffraction patterns generated by a light beam respectively illuminating a first region, a second region, and both of the first region and the second region of a diffractive optical element in FIGS. 1A and 1B.
Figure 2B:
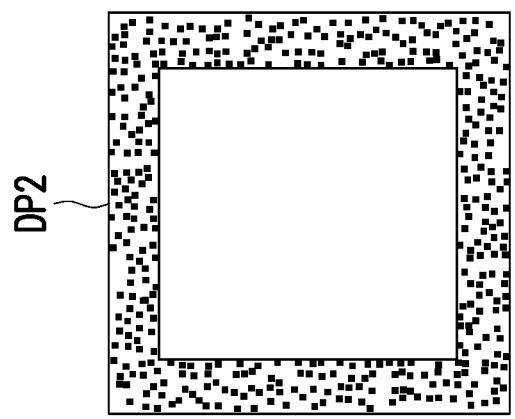
Figure 2A:
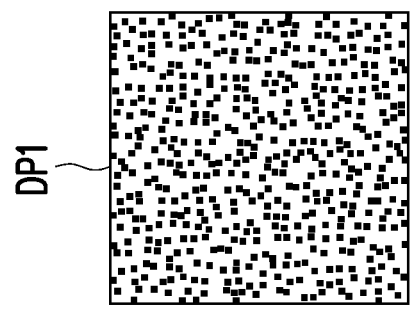

FIGS. 2A to 2C are schematic diagrams of diffraction patterns generated by the light beam B respectively illuminating the first region R1, the second region R2, and both of the first region R1 and the second region R2 of the diffractive optical element 113 in FIGS. 1A and 1B. As shown in FIGS. 2A to 2C, the diffraction pattern generated on the target by the light beam illuminating the first region is a first diffraction pattern DP1, and the diffraction pattern generated on the target by the light beam illuminating the second region is a second diffraction pattern DP2. In the embodiment, the first diffraction pattern DP1 and the second diffraction pattern DP2 do not overlap when the light beam B illuminates both of the first region R1 and the second region R2. Therefore, the diffraction pattern DP12 generated by the light beam illuminating both of the first region and the second region is the union of the first diffraction pattern DP1 and the second diffraction pattern DP2, as shown in FIG. 2C. Moreover, the dot density of the region RDP1 in the diffraction pattern DP12 corresponding to the first diffraction pattern DP1 is the same as the dot density of the first diffraction pattern DP1 in FIG. 2A, and the dot density of the region RDP2 in the diffraction pattern DP12 corresponding to the second diffraction pattern DP2 is the same as the dot density of the second diffraction pattern DP2 in FIG. 2B.

Referring back to FIGS. 1A and 1B. In the embodiment, under the first mode of the structured light projector 110, as shown in FIG. 1A, the region illuminated by the light beam B from the irradiation range controlling device 112 is consisted of the first region R1, and the first diffraction pattern DP1 as shown in FIG. 2A is generated on the target. Under a second mode of the structured light projector 110, as shown in FIG. 1B, the region illuminated by the light beam B from the irradiation range controlling device 112 is consisted of the first region R1 and the second region R2, and both of the first diffraction pattern DP1 and the second diffraction pattern DP2 are generated on the target. Therefore, the diffraction pattern (i.e. the first diffraction pattern DP1) generated under the first mode has a smaller field of view than the diffraction pattern (i.e. the diffraction pattern DP12) generated under the second mode. In other words, the first mode and the second mode of the first embodiment are a narrow field of view mode and a wide field of view mode, respectively.

Accordingly, the three-dimensional image sensing module 100 can generate a diffraction pattern with desired field of view by switching modes. Specifically, the three-dimensional image sensing module 100 can be switched to the first mode when the target requires a small field of view for obtaining the three-dimensional coordinates, e.g. when the target is relatively far from the three-dimensional image sensing module 100. On the other hand, the three-dimensional image sensing module 100 can be switched to the second mode when the target requires a large field of view for obtaining the three-dimensional coordinates, e.g. when the target is relatively close to the three-dimensional image sensing module 100.

In another embodiment, the diffractive optical element 113 can be divided into more regions (e.g. three or more regions that share the same center axis), and the three-dimensional image sensing module 100 can generate diffraction patterns with more fields of view by switching modes, accordingly.

Figure 3A:
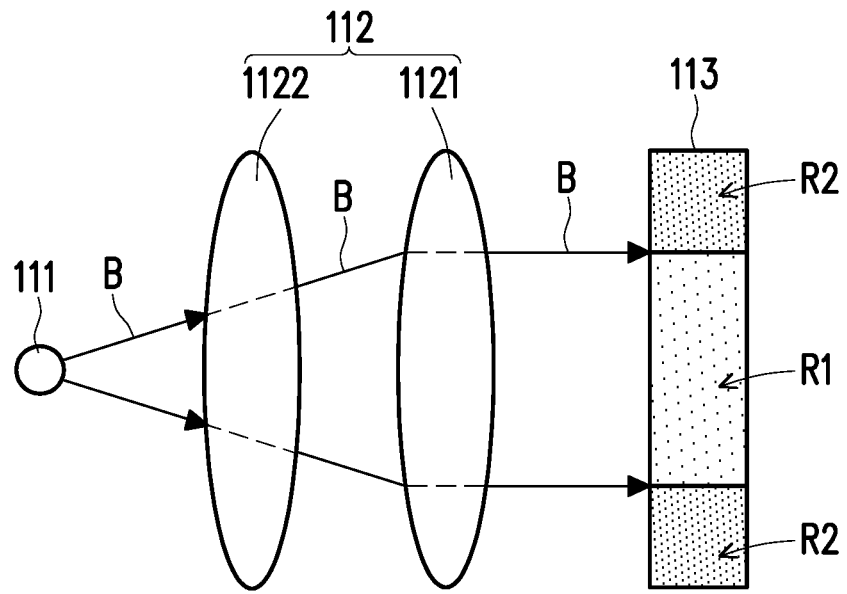
FIGS. 3A and 3B are the first schematic diagrams of a light source and an irradiation range controlling device in a structured light projector according to an embodiment of the invention under the first mode and the second mode, respectively.
Figure 3B:
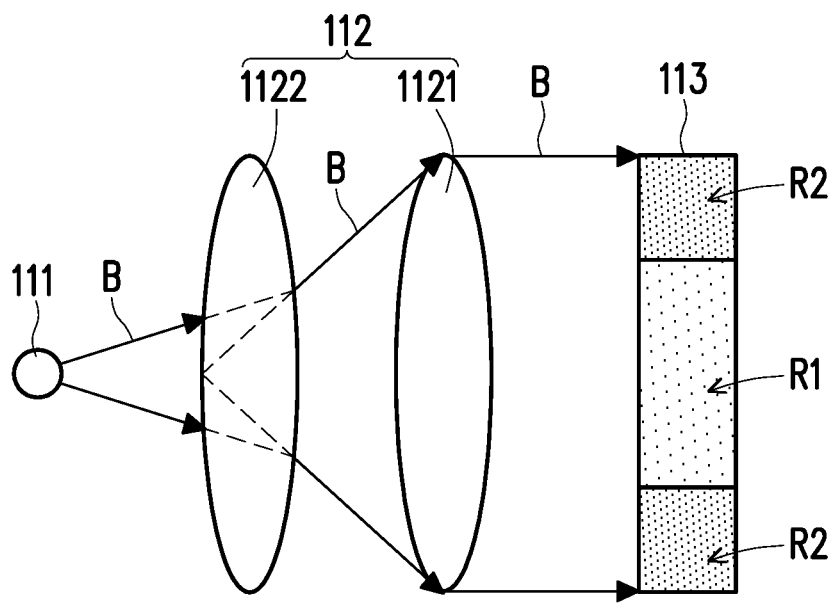

How the irradiation range of the light beam is controlled by the irradiation range controlling device is explained below with references to FIGS. 3A to 6B. FIGS. 3A and 3B are the first schematic diagrams of a light source and an irradiation range controlling device in a structured light projector according to an embodiment of the invention under the first mode and the second mode, respectively. Referring to FIGS. 3A and 3B, the irradiation range controlling device 112 may include a plurality of tunable lenses, such as a tunable lens 1121 and a tunable lens 1122. FIGS. 3A and 3B schematically show two tunable lenses, but the number of the tunable lenses included in the irradiation range controlling device 112 is not limited thereto. It is noted that the tunable lens means the focus length is tunable.

The tunable lens 1122 and the tunable lens 1121 are sequentially disposed on the transmission path of the light beams B from the light source 111. Each of the tunable lens 1122 and the tunable lens 1121 has tunable refracting power. For example, the tunable lens 1122 and the tunable lens 1121 are liquid crystal lenses, and the refracting power thereof can be tuned according to the voltage applied thereto. The tunable lens 1122 is adapted to adjust the divergence of the light beam, and the tunable lens 1121 is adapted to collimate the light beam to form parallel light beams B (or substantially parallel light beams B).

Under the first mode, as shown in FIG. 3A, the light beams B from the light source 111 are transmitted to the first region R1 of the diffractive optical element 113 after sequentially passing through the tunable lens 1122 and the tunable lens 1121. On the other hand, under the second mode, as shown in FIG. 3B, the light beams B from the light source 111 are transmitted to both of the first region R1 and the second region R2 of the diffractive optical element 113 after sequentially passing through the tunable lens 1122 and the tunable lens 1121. Therefore, the light beams B under the second mode have a wider irradiation range than the light beams B under the first mode.

Figure 4A:
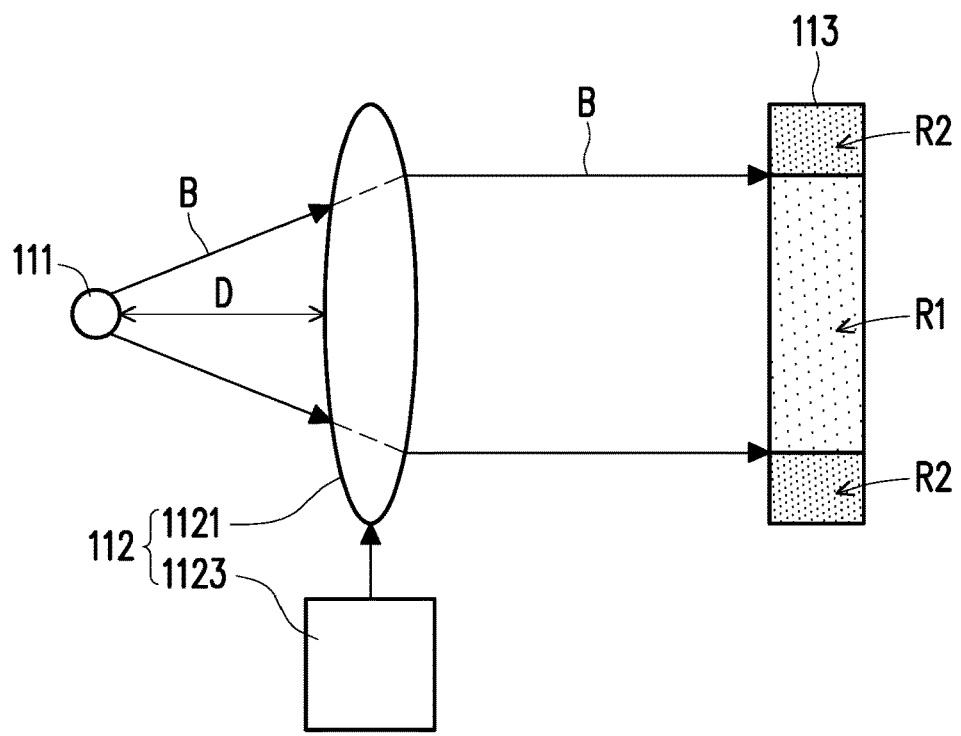
FIGS. 4A and 4B are the second schematic diagrams of the light source and the irradiation range controlling device in the structured light projector according to the embodiment of the invention under the first mode and the second mode, respectively.
Figure 4B:
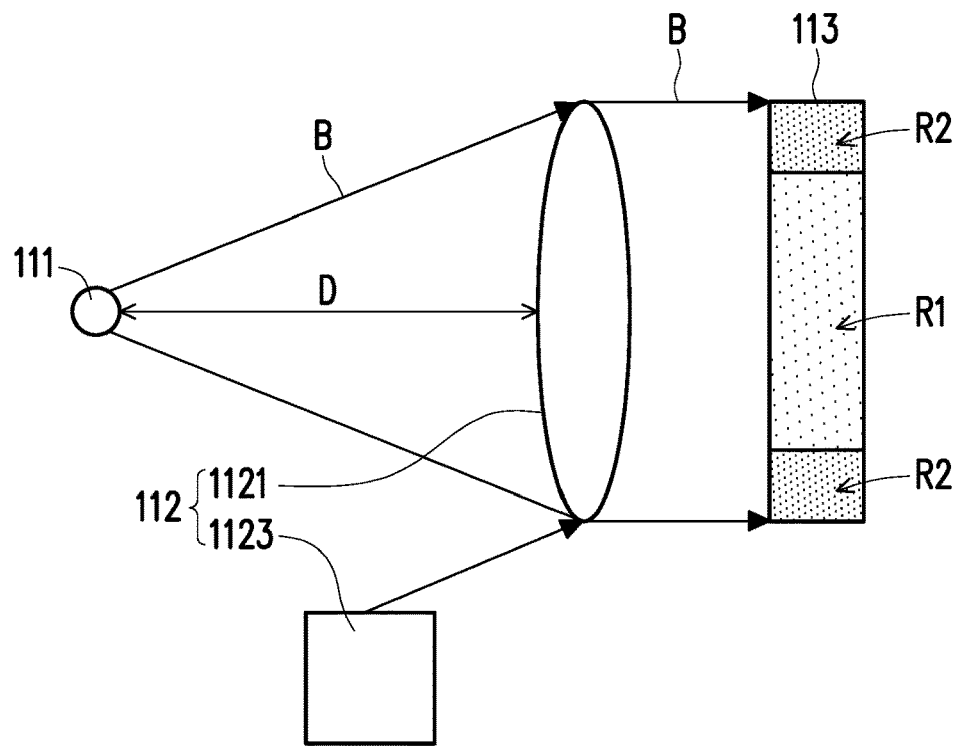

FIGS. 4A and 4B are the second schematic diagrams of the light source and the irradiation range controlling device in the structured light projector according to the embodiment of the invention under the first mode and the second mode, respectively. Referring to FIGS. 4A and 4B, the irradiation range controlling device 112 may include the tunable lens 1121 and a position controlling device 1123. The position controlling device 1123 is adapted to control at least one of a position of the tunable lens 1121 and a position of the light source 111.

Specifically, the irradiation range of the light beams B transmitted to the diffractive optical element 113 becomes smaller when a distance D between the tunable lens 1121 and the light source 111 becomes smaller, and the irradiation range of the light beams B transmitted to the diffractive optical element 113 becomes larger when a distance D between the tunable lens 1121 and the light source 111 becomes larger. Therefore, the region illuminated by the light beams B from the tunable lens 1121 can be controlled by modulating the distance D between the tunable lens 1121 and the light source 111 through the position controlling device 1123. The position controlling device 1123 can be any device that is capable of moving the element(s) listed above. For example, the position controlling device 1123 includes a motor, but the invention is not limited thereto.

In the embodiment, the distance D is controlled by moving the tunable lens 1121 without changing the position of the light source 111. Alternatively, the distance D may be controlled by moving the light source 111 without changing the position of the tunable lens 1121. Alternatively, the distance D may be controlled by moving both of the tunable lens 1121 and the light source 111. It is noted that the tunable lens 1121 should change its focus length so as to let the light source 111 be on its focus position based on the variation of the distance D. In this way, the tunable lens 1121 collimates the light beam to form parallel light beams B.

Figure 5A:
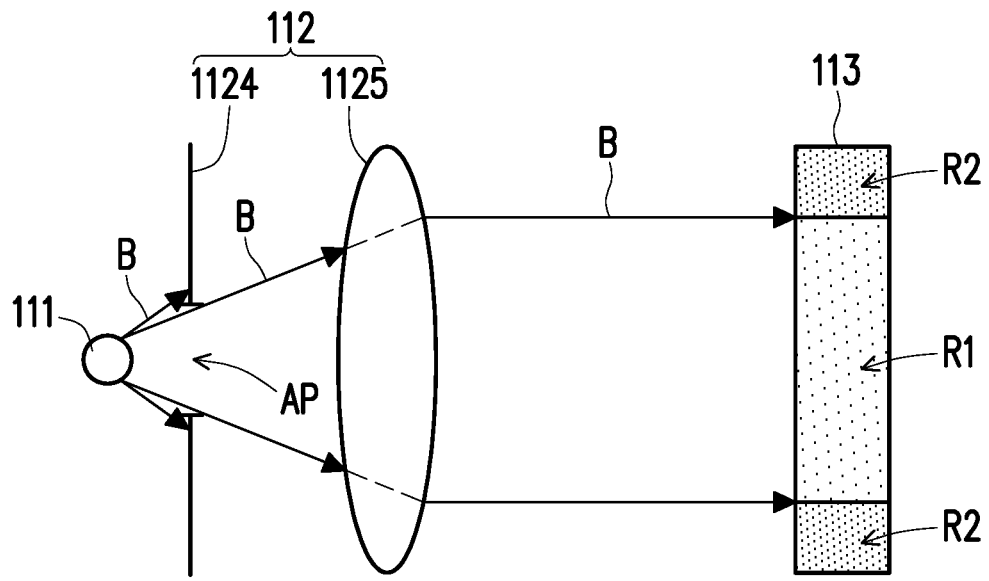
FIGS. 5A and 5B are the third schematic diagrams of the light source and the irradiation range controlling device in the structured light projector according to the embodiment of the invention under the first mode and the second mode, respectively.
Figure 5B:
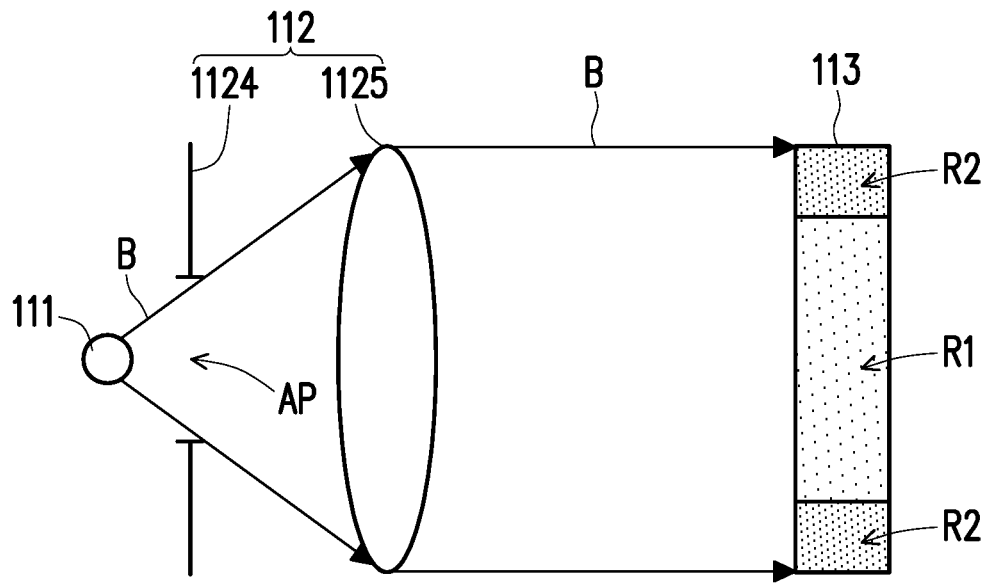

FIGS. 5A and 5B are the third schematic diagrams of the light source and the irradiation range controlling device in the structured light projector according to the embodiment of the invention under the first mode and the second mode, respectively. Referring to FIGS. 5A and 5B, the irradiation range controlling device 112 may include a light collimating element 1125 and a tunable aperture stop 1124. The tunable aperture stop 1124 is disposed on the transmission path of the light beams B from the light source 111. The light collimating element 1125 is disposed on a transmission path of the light beams B from the tunable aperture stop 1124. The tunable aperture stop 1124 has a tunable aperture AP. For example, the tunable aperture stop 1124 includes an electronically controlled light modulation material, such as an electrochromic material or a liquid crystal material, and the tunable aperture AP thereof can be tuned according to the voltage applied thereto, but the invention is not limited thereto.

The smaller the tunable aperture AP, the more the light beams B are blocked by the tunable aperture stop 1124, and therefore the narrower the irradiation range of the light beams B transmitted to the diffractive optical element 113. In other words, the region of the diffractive optical element 113 illuminated by the light beams B may be controlled by modulating the size of the tunable aperture AP.

In another embodiment, the light collimating element 1125 can be integrated with the diffractive optical element 113. As such, the light collimating element 1125 in the irradiation range controlling device 112 may be omitted.

Figure 6A:
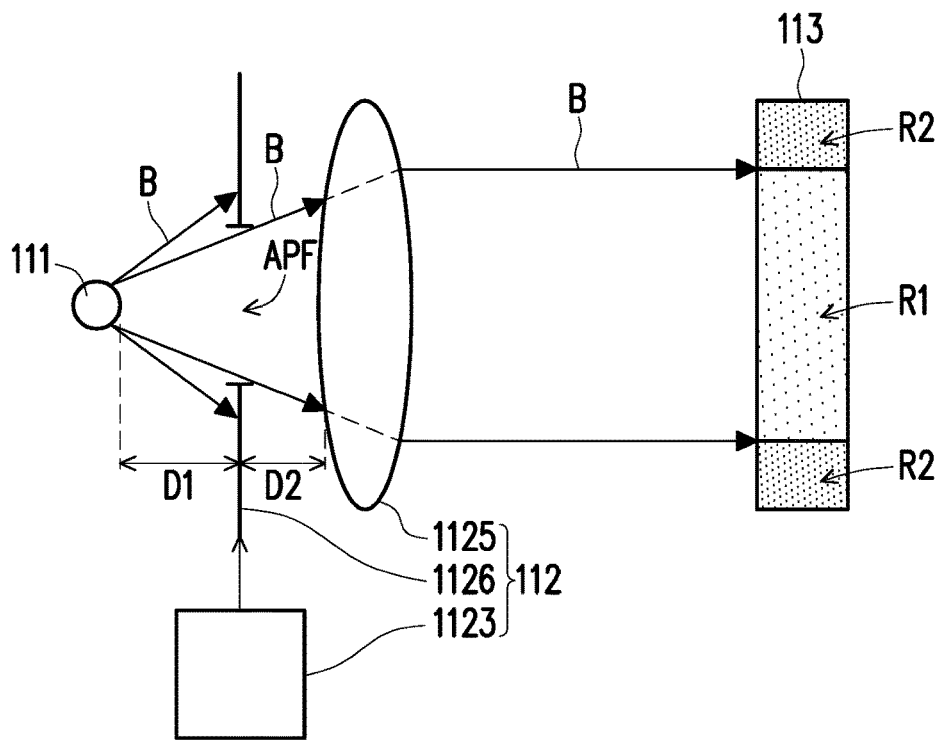
FIGS. 6A and 6B are the fourth schematic diagrams of the light source and the irradiation range controlling device in the structured light projector according to the embodiment of the invention under the first mode and the second mode, respectively.
Figure 6B:
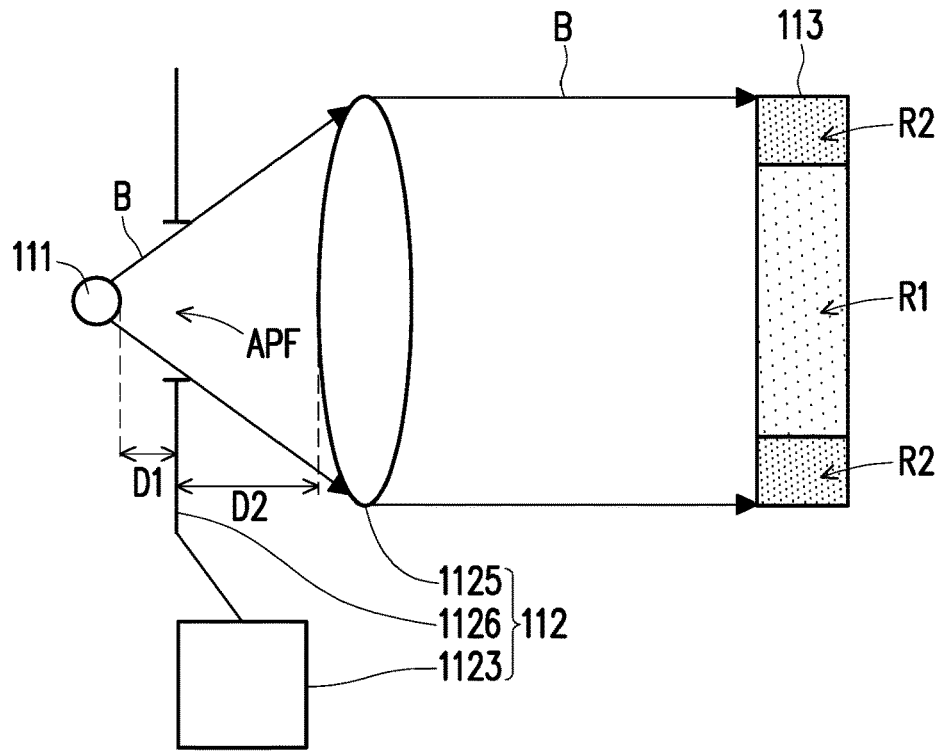

FIGS. 6A and 6B are the fourth schematic diagrams of the light source and the irradiation range controlling device in the structured light projector according to the embodiment of the invention under the first mode and the second mode, respectively. Referring to FIGS. 6A and 6B, the irradiation range controlling device 112 may include the light collimating element 1125, an aperture stop 1126 with a fixed aperture APF, and the position controlling device 1123. The aperture stop 1126 is disposed on the transmission path of the light beams B from the light source 111. The light collimating element 1125 is disposed on a transmission path of the light beams B from the aperture stop 1126. The position controlling device 1123 is adapted to control a position of the aperture stop 1126. Specifically, in the case where the size of the aperture APF is a constant, the larger the distance D1 between the light source 111 and the aperture stop 1126, the narrower the irradiation range of the light beams B transmitted to the diffractive optical element 113. Moreover, the smaller the distance D2 between the aperture stop 1126 and the light collimating element 1125, the narrower the irradiation range of the light beams B transmitted to the diffractive optical element 113. In another embodiment, the light collimating element 1125 can be integrated with the diffractive optical element 113. As such, the light collimating element 1125 in the irradiation range controlling device 112 may be omitted.

Referring back to FIGS. 1A and 1B, the image sensor 120 is adapted to capture an image of the diffraction pattern (e.g. the first diffraction pattern DP1 or the diffraction pattern DP12) generated (or projected) on the target by the light beam B illuminating the region of the diffractive optical element 113. For example, the image sensor 120 includes a charge coupled device (CCD) or a complementary metal oxide semiconductor (CMOS), but the invention is not limited thereto.

The computing device 130 is coupled to the image sensor 120 to receive the signal S corresponding to the captured image, and the computing device 130 is adapted to calculate a depth information of the target according to the captured image. Specifically, the computing device 130 may be electrically connected to the image sensor 120 in a wire or wireless way. The computing device 130 may include a central processing unit (CPU), a data processing unit (DPU) or a graphics processing unit (GPU) to calculate a depth information of the target by comparing the differences between the diffraction pattern on the target and the original diffraction pattern.

Based on the above, in the first embodiment of the structured light projector 110 and the three-dimensional image sensing module 100, the region of the diffractive optical element 113 illuminated by the light beam B is modulated by disposing the irradiation range controlling device 112 on the transmission path of the light beam B from the light source 111, such that the field of view of the diffraction pattern can be functionally modulated. Therefore, the three-dimensional image sensing module 100 is capable of obtaining the three-dimensional coordinates (or measuring depth information) of targets that need different fields of view. Moreover, since all the elements in the structured light projector 110 can be disposed on the same optical axis, the calibration done by the computing device 130 can be easier. Furthermore, since only one diffractive optical element 113 is needed in the structured light projector 110, the structured light projector 110 can have low cost.

Figure 7A:
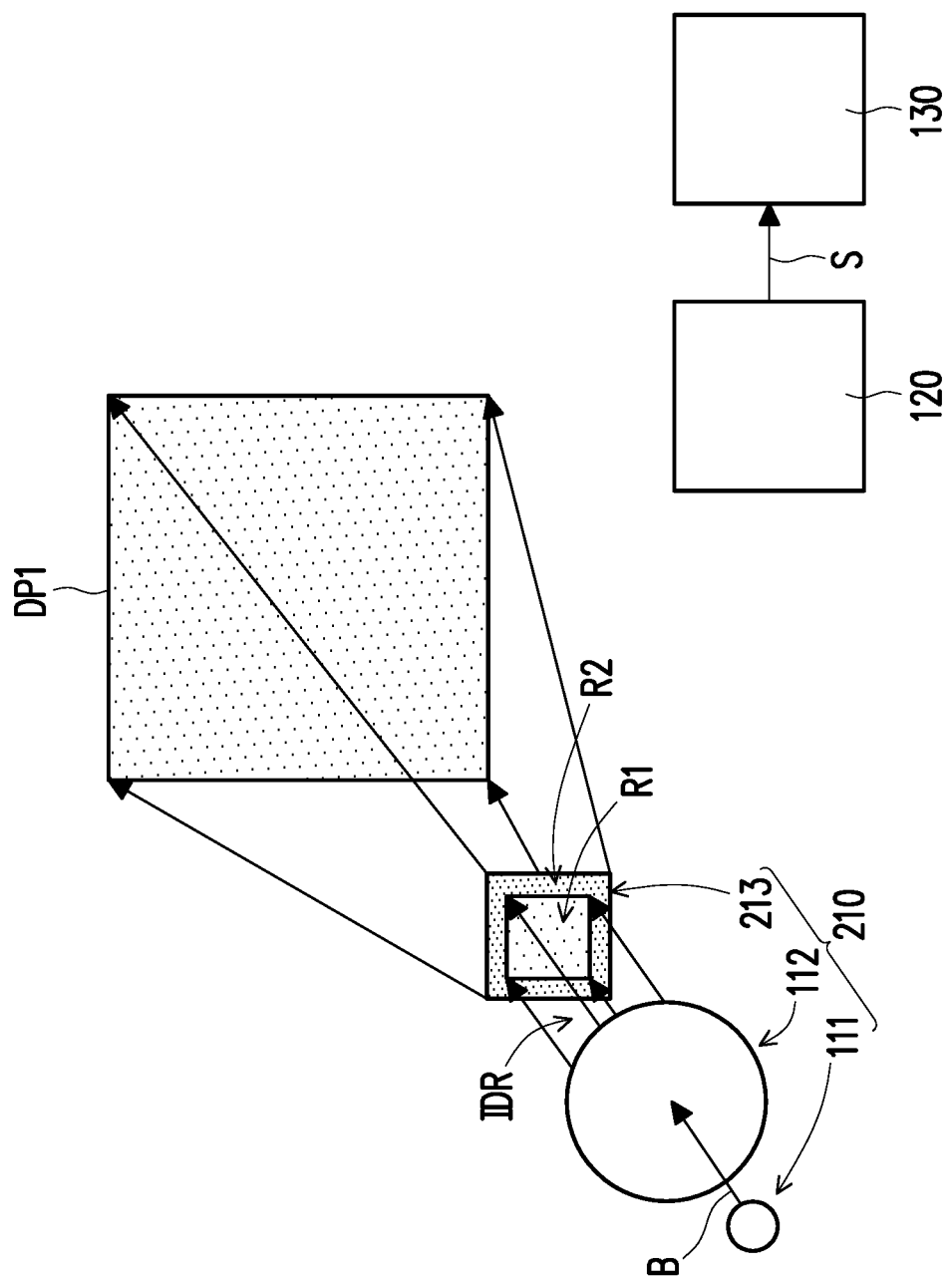
FIGS. 7A and 7B are schematic diagrams of a three-dimensional image sensing module according to a second embodiment of the invention under the first mode and the second mode, respectively.
Figure 7B:
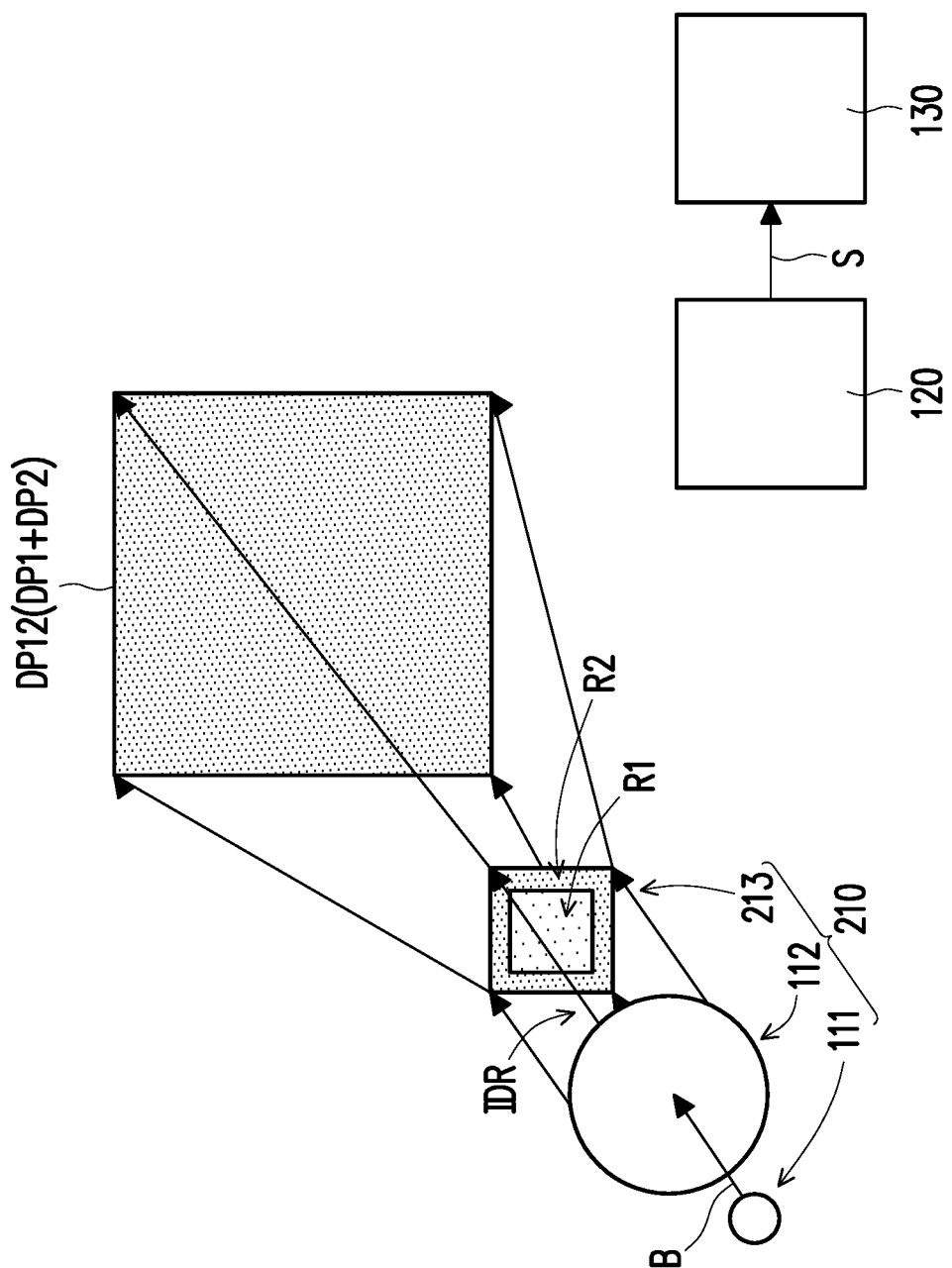
Figure 8C:
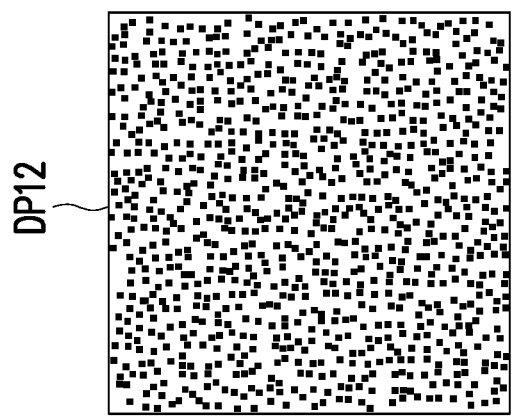
FIGS. 8A to 8C are schematic diagrams of diffraction patterns generated by a light beam respectively illuminating a first region, a second region, and both of the first region and the second region of a diffractive optical element in FIGS. 7A and 7B.
Figure 8B:
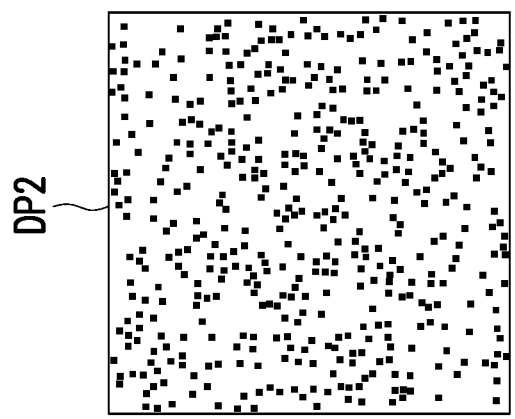
Figure 8A:
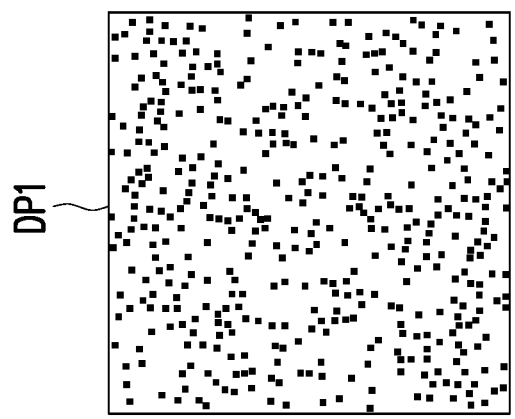

FIGS. 7A and 7B are schematic diagrams of a three-dimensional image sensing module according to a second embodiment of the invention under the first mode and the second mode, respectively. FIGS. 8A to 8C are schematic diagrams of diffraction patterns generated by a light beam respectively illuminating a first region, a second region, and both of the first region and the second region of a diffractive optical element in FIGS. 7A and 7B.

Referring to FIGS. 7A and 7B, the three-dimensional image sensing module 200 is similar to the three-dimensional image sensing module 100 in FIGS. 1A and 1B. The main difference between the three-dimensional image sensing module 200 and the three-dimensional image sensing module 100 is the design of the structured light projector.

Specifically, in the structured light projector 210 of the three-dimensional image sensing module 200, the microstructures in the first region R1 and the second region R2 of the diffractive optical element 113 are designed such that the size of the first diffraction pattern DP1 generated by the light beam B illuminating the first region R1 is the same as the size of the second diffraction pattern DP2 generated by the light beam B illuminating the second region R2, while the dot density (or dot distribution) of the first diffraction pattern DP1 is different from the dot density (or dot distribution) of the second diffraction pattern DP2, as shown in FIGS. 8A and 8B. As such, the first diffraction pattern DP1 and the second diffraction pattern DP2 overlap when the light beam B illuminates both of the first region R1 and the second region R2, and the diffraction pattern DP12 generated by the light beam B illuminating both of the first region R1 and the second region R2 is the superposition of the first diffraction pattern DP1 and the second diffraction pattern DP2. Therefore, the diffraction pattern (e.g. the first diffraction pattern DP1) generated under the first mode has a smaller dot density than the diffraction pattern (e.g. the diffraction pattern DP12) generated under the second mode. The higher the dot density, the higher the resolution of the diffraction pattern, and therefore the higher the recognition ability of the three-dimensional image sensing module 200. In other words, the first mode and the second mode of the second embodiment are a low resolution mode and a high resolution mode, respectively.

Accordingly, the three-dimensional image sensing module 200 can generate a diffraction pattern with desired resolution by switching modes. Specifically, the three-dimensional image sensing module 200 can be switched to the first mode when the target requires low resolution for obtaining the three-dimensional coordinates (especially the depth information), e.g. when the target has a relatively sparse depth variation in the measurement range. On the other hand, the three-dimensional image sensing module 200 can be switched to the second mode when the target requires high resolution for obtaining the three-dimensional coordinates (especially the depth information), e.g. when the target has a relatively dense depth variation in the measurement range.

In another embodiment, the diffractive optical element 213 can be divided into more regions (e.g. three or more regions that share the same center axis), and the three-dimensional image sensing module 200 can generate diffraction patterns with more resolutions by switching modes, accordingly.

Based on the above, in the second embodiment of the structured light projector 210 and the three-dimensional image sensing module 200, the region of the diffractive optical element 213 illuminated by the light beam B is modulated by disposing the irradiation range controlling device 112 on the transmission path of the light beam B from the light source 111, such that the resolution of the diffraction pattern can be functionally modulated. Therefore, the three-dimensional image sensing module 200 is capable of obtaining the three-dimensional coordinates (or measuring depth information) of targets that need different resolutions. Moreover, since all the elements in the structured light projector 210 can be disposed on the same optical axis, the calibration done by the computing device 130 can be easier. Furthermore, since only one diffractive optical element 213 is needed in the structured light projector 210, the structured light projector 210 can have low cost.

Figure 9C:
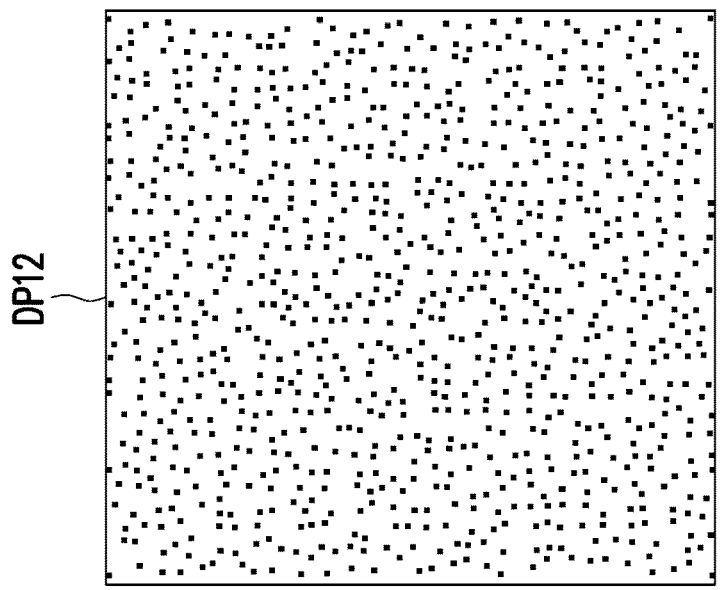
FIGS. 9A to 9C are schematic diagrams of diffraction patterns generated by a light beam respectively illuminating a first region, a second region, and both of the first region and the second region of a diffractive optical element according to an embodiment of the invention.
Figure 9B:
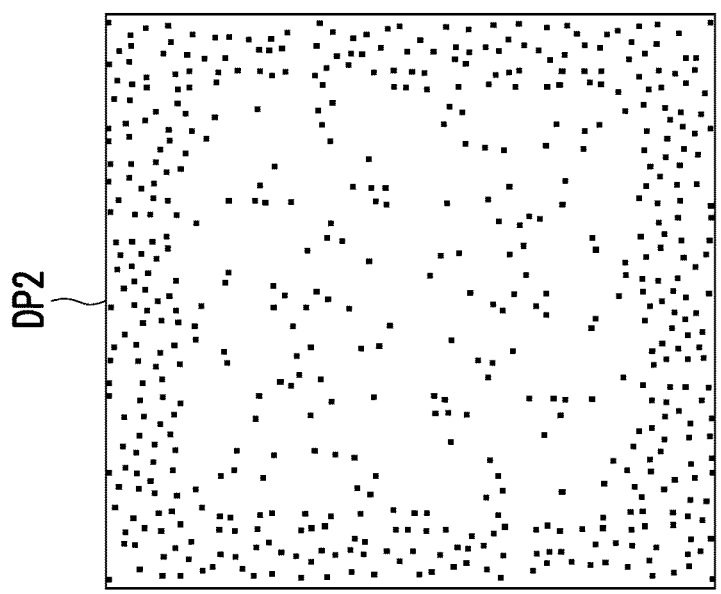
Figure 9A:
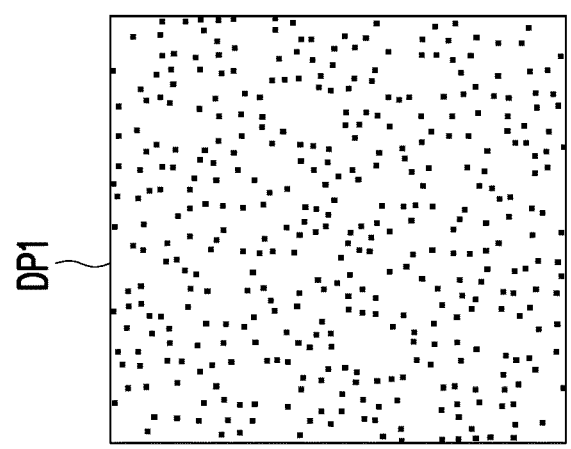

In the above embodiments, the field of view and the dot density are modulated individually. However, the invention is not limited thereto. FIGS. 9A to 9C are schematic diagrams of diffraction patterns generated by a light beam respectively illuminating a first region, a second region, and both of the first region and the second region of a diffractive optical element according to an embodiment of the invention. Referring to FIGS. 9A to 9C, the microstructures in each region of the diffractive optical element can be designed as required, so that the first diffraction pattern DP1 and the second diffraction pattern DP2 partially overlap (e.g. the overlapped area between the first diffraction pattern DP1 and the second diffraction pattern DP2 is equal to the area of the first diffraction pattern DP1), the diffraction pattern (e.g. the first diffraction pattern DP1) generated under the first mode has a smaller field of view than the diffraction pattern (e.g. the diffraction pattern DP12) generated under the second mode, and the diffraction pattern (e.g. the first diffraction pattern DP1) generated under the first mode has a smaller dot density than the diffraction pattern (e.g. the diffraction pattern DP12) generated under the second mode. In other words, the first mode is a narrow field of view and low resolution mode, while the second mode is a wide field of view and high resolution mode.

Accordingly, the three-dimensional image sensing module using the diffractive optical element above can generate a diffraction pattern with desired field of view and resolution by switching modes. Specifically, the three-dimensional image sensing module can be switched to the first mode when the target requires a small field of view and/or low resolution for obtaining the three-dimensional coordinates (especially the depth information). On the other hand, the three-dimensional image sensing module can be switched to the second mode when the target requires a large field of view and/or high resolution for obtaining the three-dimensional coordinates (especially the depth information).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A structured light projector, comprising:
a light source;
an irradiation range controlling hardware, disposed on a transmission path of a light beam from the light source; and
a diffractive optical element, disposed on a transmission path of the light beam from the irradiation range controlling hardware, wherein the irradiation range controlling hardware is adapted to control an irradiation range of the light beam transmitted to the diffractive optical element so as to change a size of a region of the diffractive optical element illuminated by the light beam from the irradiation range controlling hardware,
wherein the diffractive optical element includes a first region and a second region surrounding the first region, a diffraction pattern generated on a target by the light beam illuminating the first region is a first diffraction pattern, and a diffraction pattern generated on the target by the light beam illuminating the second region is a second diffraction pattern, wherein
under a first mode of the structured light projector, the region illuminated by the light beam from the irradiation range controlling hardware is consisted of the first region, and the first diffraction pattern is generated on the target; and
under a second mode of the structured light projector, the region illuminated by the light beam from the irradiation range controlling hardware is consisted of the first region and the second region, and both of the first diffraction pattern and the second diffraction pattern are generated on the target.

2. The structured light projector as claimed in claim 1, wherein the light source is a laser light source.

3. The structured light projector as claimed in claim 1, wherein the irradiation range controlling hardware comprises a plurality of tunable lenses, the plurality of tunable lenses are sequentially disposed on the transmission path of the light beam from the light source, and each of the plurality of tunable lenses has tunable refracting power.

4. The structured light projector as claimed in claim 1, wherein the irradiation range controlling hardware comprises a tunable lens and a position controlling hardware, and the position controlling hardware is adapted to control at least one of a position of the tunable lens and a position of the light source.

5. The structured light projector as claimed in claim 1, wherein the irradiation range controlling hardware comprises a light collimating element and a tunable aperture stop, the tunable aperture stop is disposed on the transmission path of the light beam from the light source, the light collimating element is disposed on a transmission path of the light beam from the tunable aperture stop, and the tunable aperture stop has a tunable aperture.

6. The structured light projector as claimed in claim 1, wherein the irradiation range controlling hardware comprises a light collimating element, an aperture stop with a fixed aperture, and a position controlling hardware, the aperture stop is disposed on the transmission path of the light beam from the light source, the light collimating element is disposed on a transmission path of the light beam from the aperture stop, and the position controlling hardware is adapted to control a position of the aperture stop.

7. The structured light projector as claimed in claim 1, wherein the first diffraction pattern and the second diffraction pattern do not overlap, and the diffraction pattern generated under the first mode has a smaller field of view than the diffraction pattern generated under the second mode.

8. The structured light projector as claimed in claim 1, wherein the first diffraction pattern and the second diffraction pattern overlap, and the diffraction pattern generated under the first mode has a smaller dot density than the diffraction pattern generated under the second mode.

9. The structured light projector as claimed in claim 1, wherein the first diffraction pattern and the second diffraction pattern partially overlap, the diffraction pattern generated under the first mode has a smaller field of view than the diffraction pattern generated under the second mode, and the diffraction pattern generated under the first mode has a smaller dot density than the diffraction pattern generated under the second mode.

10. A three-dimensional image sensing module, comprising:
a structured light projector, comprising:
a light source;
an irradiation range controlling hardware, disposed on a transmission path of a light beam from the light source; and
a diffractive optical element, disposed on a transmission path of the light beam from the irradiation range controlling hardware, wherein the irradiation range controlling hardware is adapted to control an irradiation range of the light beam transmitted to the diffractive optical element so as to change a size of a region of the diffractive optical element illuminated by the light beam from the irradiation range controlling hardware;

an image sensor, adapted to capture an image of a diffraction pattern generated on a target by the light beam illuminating the region of the diffractive optical element; and
a computing device, coupled to the image sensor and calculates a depth information of the target according to the captured image,
wherein the diffractive optical element includes a first region and a second region surrounding the first region, the diffraction pattern generated on the target by the light beam illuminating the first region is a first diffraction pattern, and the diffraction pattern generated on the target by the light beam illuminating the second region is a second diffraction pattern, wherein
under a first mode of the structured light projector, the region illuminated by the light beam from the irradiation range controlling hardware is consisted of the first region, and the first diffraction pattern is generated on the target; and
under a second mode of the structured light projector, the region illuminated by the light beam from the irradiation range controlling hardware is consisted of the first region and the second region, and both of the first diffraction pattern and the second diffraction pattern are generated on the target.

11. The three-dimensional image sensing module as claimed in claim 10, wherein the light source is a laser light source.

12. The three-dimensional image sensing module as claimed in claim 10, wherein the irradiation range controlling hardware comprises a plurality of tunable lenses, the plurality of tunable lenses are sequentially disposed on the transmission path of the light beam from the light source, and each of the plurality of tunable lenses has tunable refracting power.

13. The three-dimensional image sensing module as claimed in claim 10, wherein the irradiation range controlling hardware comprises a tunable lens and a position controlling hardware, and the position controlling hardware is adapted to control at least one of a position of the tunable lens and a position of the light source.

14. The three-dimensional image sensing module as claimed in claim 10, wherein the irradiation range controlling hardware comprises a light collimating element and a tunable aperture stop, the tunable aperture stop is disposed on the transmission path of the light beam from the light source, the light collimating element is disposed on a transmission path of the light beam from the tunable aperture stop, and the tunable aperture stop has a tunable aperture.

15. The three-dimensional image sensing module as claimed in claim 10, wherein the irradiation range controlling hardware comprises a light collimating element, an aperture stop with a fixed aperture, and a position controlling hardware, the aperture stop is disposed on the transmission path of the light beam from the light source, the light collimating element is disposed on a transmission path of the light beam from the aperture stop, and the position controlling hardware is adapted to control at least one of a position of the aperture stop, a position of the light collimating element and a position of the light source.

16. The three-dimensional image sensing module as claimed in claim 10, wherein the first diffraction pattern and the second diffraction pattern do not overlap, and the diffraction pattern generated under the first mode has a smaller field of view than the diffraction pattern generated under the second mode.

17. The three-dimensional image sensing module as claimed in claim 10, wherein the first diffraction pattern and the second diffraction pattern overlap, and the diffraction pattern generated under the first mode has a smaller dot density than the diffraction pattern generated under the second mode.

18. The three-dimensional image sensing module as claimed in claim 10, wherein the first diffraction pattern and the second diffraction pattern partially overlap, the diffraction pattern generated under the first mode has a smaller field of view than the diffraction pattern generated under the second mode, and the diffraction pattern generated under the first mode has a smaller dot density than the diffraction pattern generated under the second mode.

* * * * *